(12) United States Patent
Calvo (10) Patent No.: US 10,767,527 B2
(45) Date of Patent: Sep. 8, 2020

(54) EXHAUST SYSTEM FOR A COMBUSTION ENGINE

(71) Applicant: Eberspächer Exhaust Technology GmbH & Co. KG, Neunkirchen (DE)

(72) Inventor: Silvia Calvo, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 24 days.

(21) Appl. No.: 16/047,579

(22) Filed: Jul. 27, 2018

(65) Prior Publication Data

US 2018/0334940 A1 Nov. 22, 2018

Related U.S. Application Data

(63) Continuation of application No. 14/031,221, filed on Sep. 19, 2013, now abandoned.

(30) Foreign Application Priority Data

Sep. 20, 2012 (DE) .......................... 10 2012 216 923

(51) Int. Cl.
*F01N 13/00* (2010.01)
*F01N 3/20* (2006.01)
*F01N 3/28* (2006.01)

(52) U.S. Cl.
CPC .......... *F01N 3/2066* (2013.01); *F01N 3/2892* (2013.01); *F01N 2240/20* (2013.01); *F01N 2610/02* (2013.01); *F01N 2610/102* (2013.01); *Y02A 50/2325* (2018.01); *Y02T 10/24* (2013.01)

(58) Field of Classification Search
CPC .. F01N 2240/20; F01N 3/2066; F01N 3/2892; F01N 3/035; F01N 2330/12
See application file for complete search history.

(56) References Cited

U.S. PATENT DOCUMENTS

| | | | |
|---|---|---|---|
| 7,059,118 B2* | 6/2006 | Ripper | B01F 5/0268 60/286 |
| 7,849,676 B2* | 12/2010 | Witte-Merl | F01N 3/2066 60/274 |
| 2007/0035832 A1* | 2/2007 | Hirata | B01D 53/9409 60/295 |
| 2007/0036694 A1* | 2/2007 | Nishioka | B01D 53/90 422/168 |

(Continued)

FOREIGN PATENT DOCUMENTS

| | | |
|---|---|---|
| DE | 10 2007 020812 A1 | 11/2008 |
| DE | 10 2007 048558 A1 | 4/2009 |

(Continued)

*Primary Examiner* — Jonathan R Matthias
(74) *Attorney, Agent, or Firm* — McGlew and Tuttle, P.C.

(57) ABSTRACT

An exhaust system (1) for a motor vehicle includes an exhaust gas-purifying device (2) for purifying exhaust gas (3) removed from an internal combustion engine with a reducing agent feed (4), which is arranged downstream and at a spaced location from the exhaust gas-purifying device (2) and by which a reducing agent can be introduced into the exhaust system (1). A reducing agent-deflecting device (7) is arranged between the exhaust gas-purifying device (2) and the reducing agent feed (4). The reducing agent-deflecting device (7) has at least one reducing agent-deflecting element (8) of a blade-like design.

21 Claims, 3 Drawing Sheets

(56) References Cited

U.S. PATENT DOCUMENTS

| | | | | |
|---|---|---|---|---|
| 2008/0302088 A1* | 12/2008 | Koehler | ................. | F01N 3/103 |
| | | | | 60/286 |
| 2009/0019843 A1* | 1/2009 | Levin | ................... | B01F 5/0614 |
| | | | | 60/303 |
| 2011/0225952 A1* | 9/2011 | Witte-Merl | ............ | F01N 3/035 |
| | | | | 60/274 |
| 2012/0156105 A1* | 6/2012 | Maus | ................... | F01N 3/2066 |
| | | | | 422/168 |
| 2013/0118157 A1* | 5/2013 | Kruse | .................. | F01N 3/2066 |
| | | | | 60/295 |

FOREIGN PATENT DOCUMENTS

| | | | | |
|---|---|---|---|---|
| WO | 03/004839 A1 | 1/2003 | | |
| WO | WO-2012000989 A1 * | 1/2012 | ........... | F01N 3/2066 |

* cited by examiner

EXHAUST SYSTEM FOR A COMBUSTION ENGINE

CROSS REFERENCE TO RELATED APPLICATIONS

This application is a continuation application and claims the benefit of priority under 35 U.S.C. § 120 of U.S. patent application Ser. No. 14/031,221 filed Sep. 19, 2013, which claims the benefit of priority under 35 U.S.C. § 119 of German Patent Application DE 10 2012 216 923.7 filed Sep. 20, 2012, the entire contents of which are incorporated herein by reference.

FIELD OF THE INVENTION

The present invention pertains to an exhaust system for a motor vehicle as well as to a motor vehicle with such an exhaust system.

BACKGROUND OF THE INVENTION

The exhaust gases generated in an internal combustion engine of a motor vehicle during the operation can be purified by means of a vehicle catalytic converter in order to markedly reduce the pollutant emission of the exhaust gases. Such a purifying of the exhaust gas can be carried out by adding a reducing agent to the exhaust gas of the internal combustion engine in an exhaust gas treatment means. A prior-art method, which is based on such an addition of a reducing agent to the exhaust gas, is the so-called selective catalytic reduction ("SCR"), in which nitrogen oxide compounds are chemically reduced in the exhaust gas.

Such a selective catalytic reduction is especially meaningful in connection with internal combustion engines that generate a high air excess during the combustion of fuel, as this is the case, for example, in diesel engines, in the exhaust gas of which high oxygen concentrations are present. Based on such a high oxygen concentration in the exhaust gas, the use of a conventional three-way catalytic converter for reducing nitrogen oxides is not possible. Furthermore, oxidation catalytic converters, which reduce the emission of CO and $C_mH_n$, are frequently used in connection with diesel engines. The catalytically active precious metals, for example, platinum or palladium, can be incorporated in a so-called "wash coat."

The selective catalytic reduction proper takes place in an area of the exhaust gas treatment device arranged downstream of the diesel oxidation catalytic converter. Ammonia, which must be made available to the exhaust gas treatment device, may be used as a reducing agent. However, ammonia is not injected directly into the exhaust system but is introduced in the form of a reducing agent precursor into the exhaust system to make ammonia available in the exhaust system. Such a precursor may be, for example, a urea-water solution, which is known commercially under the name "Adblue." The conversion of such a precursor into the reducing agent proper (ammonia) can take place thermally and/or with the use of a catalytic converter within an exhaust gas stream in the area of the internal combustion engine arranged downstream of the exhaust gas treatment means.

The reducing agent can be fed into the exhaust system, for example, by injection by means of an injector. Such an injector may be arranged downstream of the diesel oxidation catalytic converter proper. However, injected droplets of the urea-water solution may reach the surface of the diesel oxidation catalytic converter in certain installation situations and form undesired deposits there. This also applies to the ammonia formed from the urea-water solution, because contact of ammonia with the catalytically active precious metals of the diesel oxidation catalytic converter, for example, in a "wash coat," may lead to an undesired reaction of the ammonia with platinum or palladium into nitrogen oxides.

SUMMARY OF THE INVENTION

An object of the present invention is therefore to make available an embodiment in which the above-mentioned problems are eliminated or at least reduced.

According to the invention, an exhaust system for a motor vehicle is provided with an exhaust gas-purifying means (exhaust gas-purifying device) for purifying exhaust gas removed from an internal combustion engine of the motor vehicle. A reducing agent feed means (reducing agent feed) is located at a spaced location from the exhaust gas-purifying means, downstream, and by means of the reducing agent feed means a reducing agent can be introduced into the exhaust system. A reducing agent-deflecting means (reducing agent-deflecting device) is arranged between the exhaust gas-purifying means and the reducing agent feed means and has at least one reducing agent-deflecting element of a blade-like design (blade design or blade shape).

The present invention is based on the general idea of providing a reducing agent-deflecting means, which has at least one reducing agent-deflecting element designed in the manner of a blade, between the exhaust gas-purifying means of the exhaust system, for example, a diesel oxidation catalytic converter "DOC," and the reducing agent feed means, for example, in the manner of an injector for introducing a urea-water solution into the exhaust system.

It can be achieved by means of such a reducing agent deflecting means that an undesired contact between the precursor of the reducing agent, i.e., for example, a urea-water solution or the reducing agent itself, for example, ammonia, and the exhaust gas-purifying means, for example, a diesel oxidation catalytic converter, is avoided. This applies especially to the precious metals that are catalytically active in the exhaust gas-purifying means.

Reducing agent and reducing agent precursor aqueous solution can be deflected from the exhaust gas-purifying means by means of at least one reducing agent-deflecting element, so that the precursor or the reducing agent formed from the precursor can be extensively or completely prevented from entering the diesel oxidation catalytic converter.

The undesired formation of deposits or byproducts, e.g., nitrogen oxides, in the exhaust gas-purifying means is thus avoided to a great extent or even completely, which in turn leads to an improvement of the performance capacity of the exhaust system.

The exhaust system according to the present invention comprises an exhaust gas-purifying means for purifying exhaust gas removed from an internal combustion engine of a motor vehicle as well as a reducing agent feed means, which is arranged downstream of and at a spaced location from the exhaust gas-purifying means. Reducing agent can be introduced into the exhaust system by means of such a reducing agent feed means. The term "reducing agent feed means" is defined here not only as a means that introduces a reducing agent, e.g., ammonia, directly into the exhaust system, but this term also covers expressly the indirect feed of the reducing agent, such that a precursor of the reducing agent, e.g., a urea-water solution, is introduced into the exhaust system by means of the reducing agent feed means, and this precursor reacts in the exhaust system by means of a thermal reaction or a similar reaction to form the reducing agent proper.

Corresponding to an advantageous embodiment, the reducing agent feed means may be designed and/or arranged such that a direction of flow, with which the reducing agent is introduced into the exhaust system, extends at least partly opposite the direction of flow of the exhaust gas in the exhaust system. In other words, the reducing agent is introduced such that at least at the beginning, it has a direction of propagation or motion that has a direction component opposite the direction of flow of the exhaust gas flow, so that the reducing agent moves in the direction of the exhaust gas-purifying means arranged upstream. The time available for the evaporation of the reducing agent as well as for mixing with the exhaust gas is prolonged hereby, which improves the efficiency of the introduction of the reducing agent in a crowded space. The (principal) direction of flow of the reducing agent is preferably inclined by 45°+30°, especially 45°+15°, in relation to the (principal) direction of flow of the exhaust gas.

The reducing agent-deflecting element may be designed in a preferred embodiment such that reducing agent introduced by the reducing agent feed means into the exhaust system and reaching the reducing agent-deflecting element is deflected in a direction away from the exhaust gas-purifying means. It is achieved by means of such a deflection that only a very low percentage of the reducing agent introduced by the reducing agent feed means into the exhaust system can enter the exhaust gas-purifying means and lead to undesired byproducts or deposits there. No reducing agent enters the exhaust gas-purifying means at all in the ideal case. It is achieved with such a deflection of the reducing agent in a direction pointing away by means of the reducing agent deflecting means and the reducing agent-deflecting element(s) thereof that the components of the exhaust gas-purifying means, especially the surface thereof, e.g., a platinum coating, are not contacted and contaminated by the reducing agent, so that an undesired chemical reactions of the reducing agent with the surface of the exhaust gas-purifying means can be avoided. In other words, the exhaust gas-purifying means is within the direction and a range of the injected reducing agent, and the deflecting element prevents reducing agent from contacting the exhaust gas-purifying means, where that reducing agent would otherwise contact the exhaust gas-purifying means without the deflecting element In addition or as an alternative, provisions may be made in another embodiment for the reducing agent-deflecting element to be designed such that liquid reducing agent introduced by the reducing agent feed means into the exhaust system and reaching the reducing agent-deflecting element is evaporated. The evaporation of the reducing agent can be supported by providing an impact and evaporator surface. In particular, the reducing agent-deflecting element may have the respective evaporator surface on the outgoing flow side in relation to the exhaust gas flow, so that said surface is heated by the incoming exhaust gas flow, which supports the evaporation. Especially advantageous is an embodiment in which the liquid reducing agent is introduced specifically such that reducing agent is admitted to the reducing agent-deflecting element, such that an essential percentage of the evaporation takes place at the reducing agent-deflecting element. A mixing section between the exhaust gas-purifying means and an SCR catalytic converter, which is possibly arranged downstream therefrom, can be increased or better utilized hereby.

The reducing agent-deflecting means is arranged and/or fastened on an outlet side of the exhaust gas-purifying means in an especially preferred embodiment. The reducing agent-deflecting means can be used especially efficiently in this manner if reducing agent or a precursor thereof is introduced by means of the reducing agent feed means into the exhaust system downstream of the exhaust gas-purifying means and is injected into the exhaust system against the direction of flow of the exhaust gas.

To protect the exhaust gas-purifying means especially well from the range of the reducing agent or precursor thereof, which is injected into the exhaust system, the reducing agent-deflecting means may comprise not only a single reducing agent-deflecting element, but a plurality of such reducing agent-deflecting elements, which are all arranged in the area of the outlet side of the exhaust gas-purifying means.

An especially large action cross section of the reducing agent-deflecting means can be obtained by means of a line of sight blocking arrangement and/or a line of sight blocking design of the reducing agent-deflecting elements in a direction of propagation of the reducing agent or precursor towards the outlet side. "Direction of propagation" is defined as a direction in which the reducing agent or the precursor thereof is injected into the exhaust system by means of the reducing agent feed means.

It can be conceived in a further embodiment that the outlet side defines an outlet cross-sectional area of the exhaust gas-purifying means. At least one fastening element having an essentially strut-like design, which is supported at the outlet opening on the end side, may be arranged in this area of the outlet cross-sectional area. At least one reducing agent-deflecting element may in turn be arranged at the at least one fastening element. The fastening element having an essentially strut-like design may be fastened to the outlet opening, for example, by means of welding. A mechanically especially stable arrangement of the reducing agent-deflecting elements in the area of the outlet side can be achieved and the line of sight blocking arrangement or embodiment explained above can optionally also be embodied in a simple manner due to the use of a fastening element having an essentially strut-like design.

The reducing agent-deflecting element may be formed integrally on the fastening element in an embodiment that can be manufactured in a technically especially simple manner and is therefore cost-effective.

At least two, preferably five, at most preferably 10 fastening elements arranged at spaced locations from one another may be arranged in the area of the outlet cross-sectional area in an especially preferred embodiment, which is suitable for the practical operation of the exhaust system in a motor vehicle. Each fastening element may be designed in the manner of a strut. The provision of a plurality of such fastening elements makes it possible to arrange a large number of reducing agent-deflecting elements on these fastening elements, which in turn makes possible an especially effective deflection of reducing agent or reducing agent precursor introduced into the exhaust system.

The fastening elements may preferably be arranged in the manner of a row in the outlet cross-sectional area. The reducing agent-deflecting elements can be arranged each at spaced locations from one another on the fastening element, so that a grid of reducing agent-deflecting elements is formed by the reducing agent-deflecting elements. An especially effective deflection of reducing agent or reducing agent precursor is achieved by means of such a grid-like arrangement of the reducing agent-deflecting elements.

The fastening elements may be designed as straight struts each in an embodiment that can be manufactured in a technically especially simple manner. These struts are arranged essentially in parallel and at spaced locations from one another in the area of the outlet cross-sectional area of the exhaust gas-purifying means.

In a variant that is an alternative thereto, the fastening elements may be designed each as curved struts, which may likewise be arranged at spaced locations from one another in the area of the outlet cross-sectional area of the exhaust gas-purifying means.

Improved deflection of reducing agent or reducing agent precursor by the reducing agent-deflecting elements is achieved by a design of the reducing agent-deflecting elements that is curved or angular in the axial direction according to a preferred embodiment. According to this embodiment, the reducing agent-deflecting elements are fastened to an axial end section of a respective fastening element.

The present invention pertains, furthermore, to a motor vehicle with an exhaust system with one or more of the features mentioned above as well as with an internal combustion engine that is arranged upstream of the exhaust system and is fluidically connected therewith.

It is apparent that the above-mentioned features, which will also be explained below, can be used not only in the particular combination indicated, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
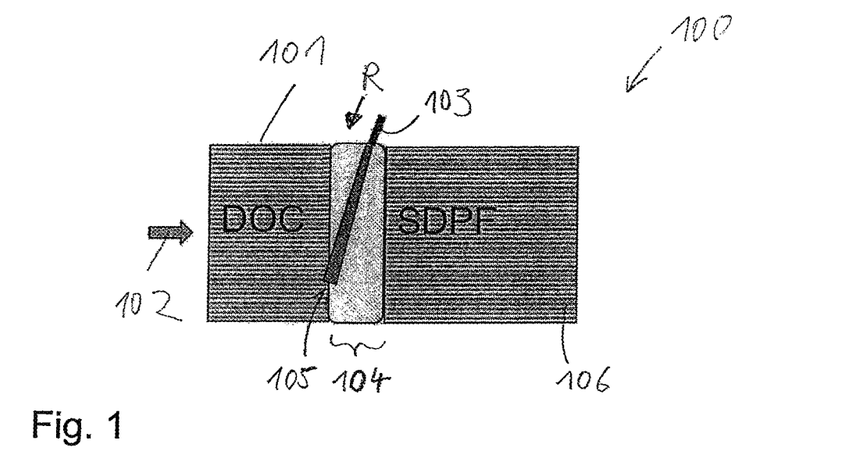
FIG. 1 is a general schematic view of an exhaust system known from the state of the art.

Referring to the drawings in particular, the view in FIG. 1 is a general schematic view of an exhaust system, which is designated by 100. Exhaust system 100 comprises an exhaust gas-purifying means 101, which may be designed, for example, as a diesel oxidation catalytic converter for purifying exhaust gas removed from combustion device such as an internal combustion engine (not shown) of the motor vehicle (see arrow 102). For example, the emission of CO and $C_mH_n$ in the exhaust gas 102 can be reduced by means of such a diesel oxidation catalytic converter.

A reducing agent feed means 103 may be arranged in the manner of an injector downstream of the exhaust gas-purifying means 101 for the purpose of selective catalytic reduction. A reducing agent precursor, for example, a urea-water solution, can be introduced into the exhaust system 100 by means of the reducing agent feed means 103. This urea-water solution can be converted into a reducing agent (e.g., ammonia) thermally and/or by means of a catalyst within the exhaust gas stream in an injection area 104 downstream of the exhaust gas-purifying means 101. Injection area 104 may be followed by a particle filter 106 ("SDPF"). A suitable mixing element, for example, in the manner of a honeycomb mixer or the like (not shown in FIG. 1 for the sake of clarity), may be arranged in injection area 104 for the effective mixing of the urea-water solution in the exhaust gas. As an alternative to this, a direction of flow R of the urea-water solution, which is injected by means of injector 103 in injection area 104 of the exhaust system, as is shown in FIG. 1, may extend at least partially opposite the direction of flow 102 of the exhaust gas in the exhaust system 100 in order to achieve an especially good mixing of the exhaust gas with the urea-water solution in this manner.

However, this has the drawback that part of the urea-water solution, which is designated by reference number 105 in FIG. 1, is injected with a direction and a range which would cause it to enter the exhaust gas-purifying means 101 and may form undesired deposits or the like in this. Furthermore, the urea-water solution or the ammonia ($NH_3$) formed from this may react with the surface coating, for example, palladium or platinum, of the exhaust gas-purifying means 101 to form nitrogen oxides ($NO_x$). Both effects lead to a reduced purifying ability of exhaust system 100.

There is a risk that reducing agent reflected by the honeycomb mixer can enter the diesel oxidation catalytic converter in an analogous manner and lead to the above-mentioned deposits or undesired byproducts (e.g., $NO_R$) there. This may occur even in the case in which a honeycomb mixer or a similar device for the especially effective mixing of the urea-water solution with the exhaust gas of the exhaust system 100 is provided in injection area 104 of the exhaust system 100.

Figures 2A, 2B:
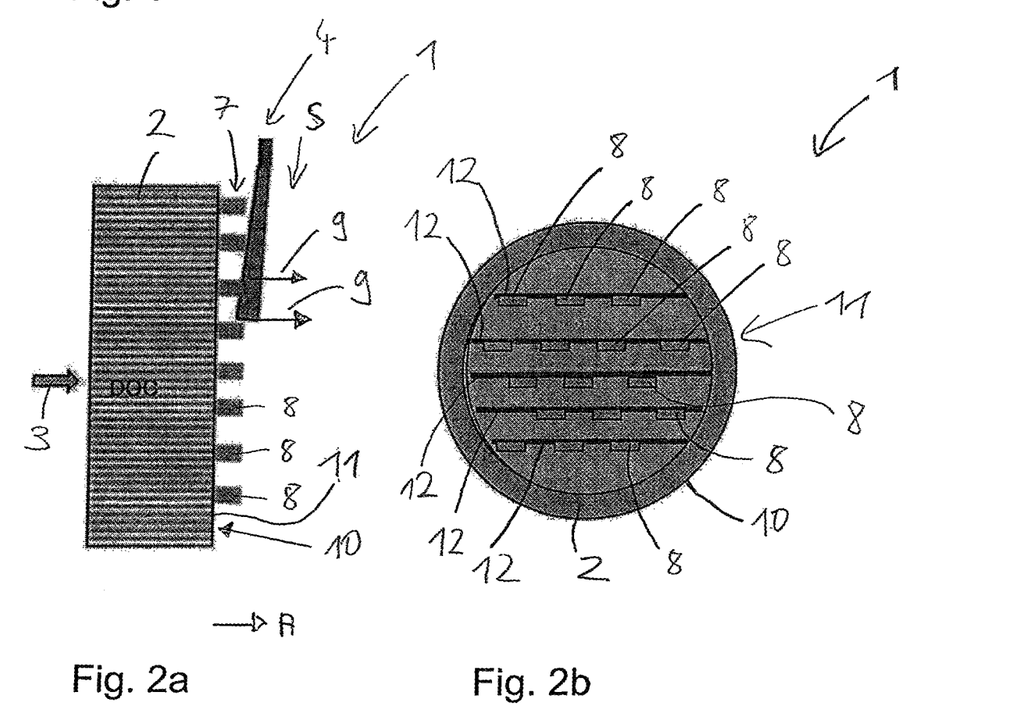
FIG. 2a is a general schematic side view of an exhaust system according to the present invention.
FIG. 2b is a general schematic rear view of an exhaust system according to the present invention.

By contrast, an exhaust system according to the present invention is shown in the view in FIGS. 2a and 2b. FIG. 2a shows a general schematic side view, and FIG. 2b shows a view against the direction of flow of the exhaust gas in exhaust system 1. The exhaust system according to the present invention is designated by 1 in FIG. 2.

Exhaust system 1 has an exhaust gas-purifying means 2 in the manner of a diesel oxidation catalytic converter for purifying exhaust gas 3 removed from the internal combustion engine of the motor vehicle (not shown). A reducing agent feed means 4, by means of which a reducing agent, which is indicated generally schematically in FIG. 2a and is designated by reference symbol S, can be introduced into exhaust system 1, is arranged downstream of and at a spaced location from the exhaust gas-purifying means 2. A reducing agent precursor solution, for example, a urea-water solution, can preferably be introduced into the exhaust system 1 by means of the reducing agent feed means 4. The reducing agent precursor can be mixed with the exhaust gas 3 from the exhaust system in an area 6 located downstream of the exhaust gas-purifying means 2 and a reducing agent, ammonia ($NH_3$) in the case of the urea-water solution, can thus be generated. Nitrogen oxides ($NO_x$) contained in the exhaust gas 3 can be reduced by means of the reducing agent into nitrogen ($N_2$).

The reducing agent can be injected in to the system 1 in a direction of flow S, which is directed at least partly opposite the direction of flow of the exhaust gas 3 (see FIG. 2a), for an effective mixing of the reducing agent precursor with the exhaust gas. To prevent the reducing agent formed from the reducing agent precursor solution from entering the exhaust gas-purifying means 2 in an undesired manner, a reducing agent-deflecting means 7, which has at least one reducing agent-deflecting element 8 of a blade-like design, is arranged according to the present invention between the exhaust gas-purifying means 2 and the reducing agent feed means 4.

The view in FIG. 2a shows as an example eight such deflecting elements 8; it is clear, however, that another number of reducing agent-deflecting elements 8 may also be provided in variants. The reducing agent-deflecting elements 8 are designed such that the reducing agent or the reducing agent precursor introduced by the reducing agent feed means 4 into the exhaust system 1 and reaching the reducing agent-deflecting elements 8 is deflected in a direction pointing away from the exhaust gas-purifying means 2 (see arrows 9). The reducing agent-deflecting means 7 may be arranged and/or fastened on an outlet side 10 of the exhaust gas-purifying means 2. The reducing agent-deflecting elements 8 may be arranged and/or designed in an line of sight blocking manner in the direction of propagation S in a preferred variant. The reducing agent can be prevented especially well from entering the exhaust gas-purifying means 2 in this manner, where it clearly would do so without the deflecting elements 8.

It can also be determined from the view in FIG. 2a that the outlet side 10 defines an outlet cross-sectional area 11 of the exhaust gas-purifying means 2. FIG. 2b shows the exhaust gas-purifying means 2 in the direction of view towards the outlet cross-sectional area 11. As an example, five fastening elements 12, which are essentially of a strut-like design and are supported each on the outlet side 10 of the exhaust gas-purifying means 2, are arranged in the area of the outlet cross-sectional area 11. It is clear that another number of fastening elements 12 of a strut-like design is also possible in variants of the exemplary embodiment. A plurality of reducing agent-deflecting elements 8 may be arranged on each of the fastening elements 12. The particular number of such deflecting elements shown in FIG. 2b should be considered to be an example only. The fastening elements 12 may be fastened on the end side to the outlet side 10 of the exhaust gas-purifying means, for example, by means of welding. The reducing agent-deflecting elements 8 may also be welded to the respective fastening elements 12. However, the reducing agent-deflecting elements 8 may also be formed integrally with the respective fastening element 12 in a variant. At least five, preferably at least ten, and at most preferably at least 20 fastening elements 12 arranged at mutually spaced locations from one another are preferably arranged in the area of the outlet cross-sectional area 11.

It can be determined from the view in FIG. 2b that the fastening elements 12 may be arranged in the form of a row in the outlet cross-sectional area 11. Since the reducing agent-deflecting elements 8 are each arranged at spaced locations from one another on each fastening element 12, a kind of grid of reducing agent-deflecting elements is formed by the reducing agent-deflecting elements 8.

As is shown in FIG. 2b as an example, the fastening elements 12 may be designed as essentially straight struts each, which are arranged essentially in parallel to and at spaced locations from one another in the area of the outlet cross-sectional area 11 of the exhaust gas-purifying means 2.

The reducing agent-deflecting elements 8 may be designed as deflecting elements that are straight in the axial direction A (see FIG. 2a).

Figure 3:
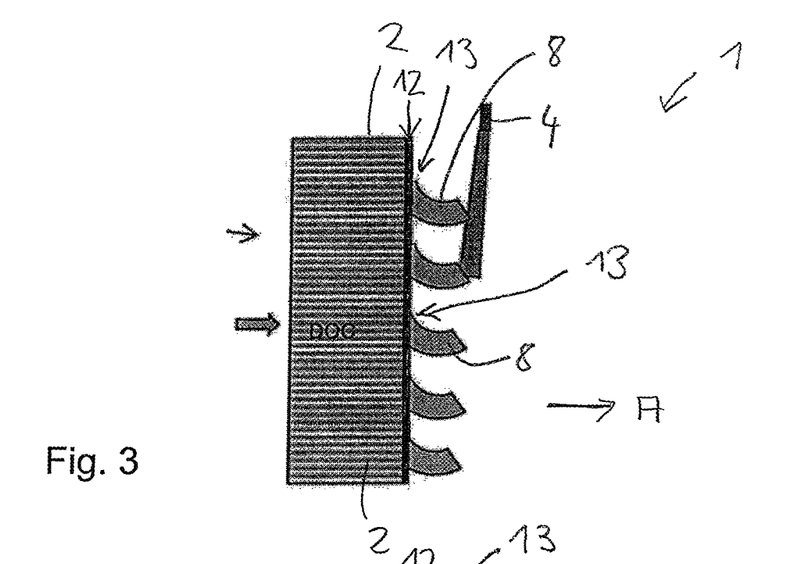
FIG. 3 is a side view showing a first variant of the exemplary embodiment according to FIGS. 2a and 2b, with deflecting elements of a curved design.
Figure 4:
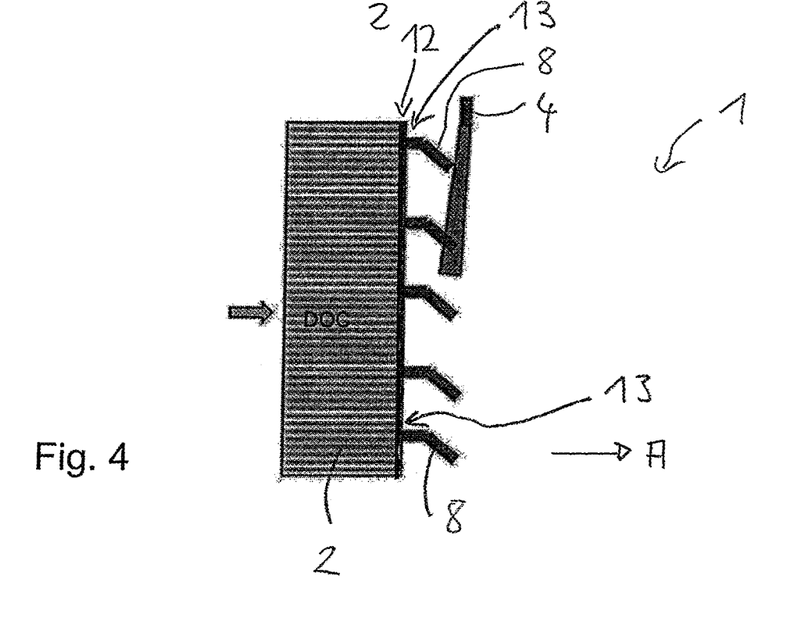
FIG. 4 is a side view showing a second variant of the exemplary embodiment according to FIGS. 2a and 2b, with deflecting elements of an angular design.

The reducing agent-deflecting elements 8 may, however, also be curved each (see FIG. 3) or angular (see FIG. 4) along the axial direction A and fastened with an axial end section 13 to a fastening element 12 each in the variants shown in FIGS. 3 and 4.

Figure 5:
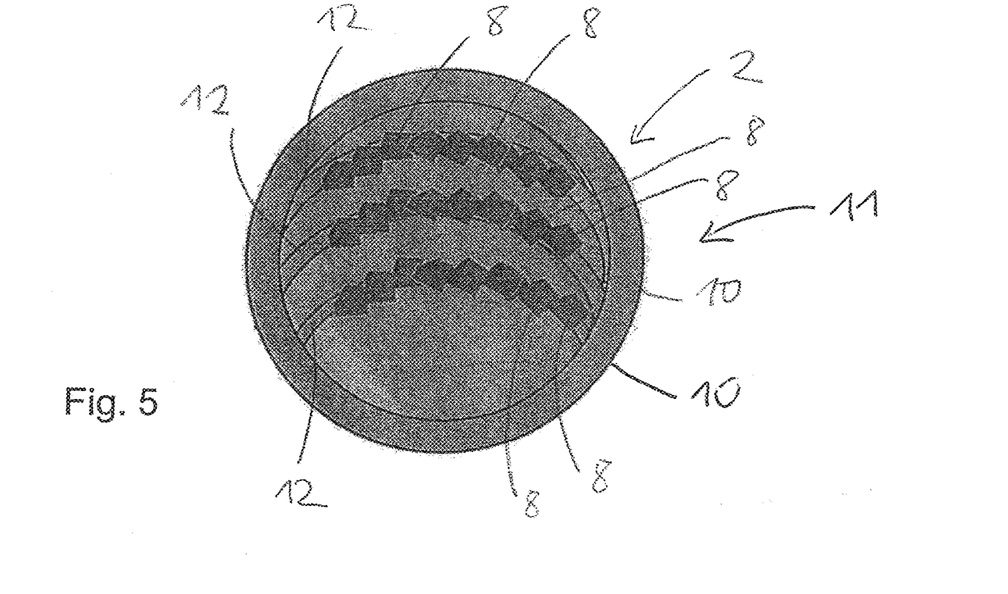
FIG. 5 is a rear view showing a third variant of the exemplary embodiment acceding to FIGS. 2a and 2b, with fastening elements of a curved design.

In a variant shown in FIG. 5, the fastening elements 12 may be designed as curved struts each, which are arranged at mutually spaced locations from one another in the area of the outlet cross-sectional area 11 of the exhaust gas-purifying means 2.

Figure 6:
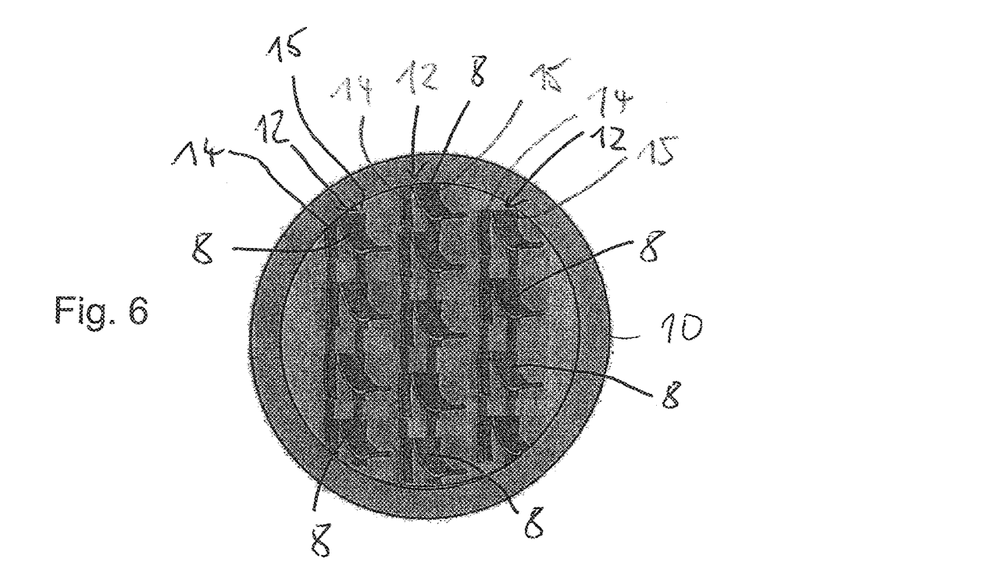
FIG. 6 is a rear view showing a fourth variant of the exemplary embodiment according to FIGS. 2a and 2b with fastening elements of a two-part design.

Finally, the view in FIG. 6 shows a special variant of the fastening elements 12 and of the reducing agent-deflecting elements 8 fastened thereto. The fastening elements 12 are designed as two-part struts with first and second strut elements 14, 15 each. The two strut elements 14, 15 are arranged in parallel to one another and at mutually spaced locations from one another, extending in an axial direction A. A plurality of reducing agent-deflecting elements 8 are arranged in an intermediate area between the first and second strut elements 14, 15 adjacent to one another in the axial direction and at spaced locations from one another and are connected to one another on the end side each with the first and second strut elements 14, 15, for example, by means of welding. As an alternative to this, the reducing agent-deflecting elements 8 may, however, also be formed integrally with the two strut elements 14, 15.

The view in FIG. 6 shows reducing agent-deflecting elements of a curved design. It is clear, however, that reducing agent-deflecting elements 8 of a straight design or of an angular design (see FIGS. 2 and 4 for this) are also conceivable in other variants.

While specific embodiments of the invention have been shown and described in detail to illustrate the application of the principles of the invention, it will be understood that the invention may be embodied otherwise without departing from such principles.

What is claimed is:

1. An exhaust system for a combustion engine, the exhaust system comprising:
    an exhaust gas-purifying device having an inlet side arranged to receive exhaust gas from the combustion engine, said exhaust gas-purifying device having an outlet side arranged to discharge the exhaust gas from said exhaust gas-purifying device, said exhaust gas-purifying device having a passage to guide the exhaust gas from said inlet side to said outlet side, a surface of said passage having a material to purify the exhaust gas;
    an injection area connected to said outlet side of said exhaust gas-purifying device and receiving the exhaust gas from said exhaust gas-purifying device;
    a reducing agent feed mounted in said injection area and configured to introduce reducing agent into said injection area in a feed direction and with a feed range, said feed direction being opposite to a direction of the exhaust gas through said injection area, said material of said exhaust gas-purifying device being arranged in said feed direction and said feed range;

a deflecting device arranged between the exhaust gas-purifying device and said reducing agent feed, said deflecting device being arranged to block the reducing agent from contacting said material of said exhaust gas-purifying device.

2. An exhaust system in accordance with claim 1, wherein:

said deflecting device includes a plurality of deflecting elements, each of said deflecting elements being spaced from each other in a grid arrangement;

said deflecting device and said reducing agent feed being arranged to cause the reducing agent to travel from said reducing agent feed to said deflecting elements in the direction opposite to the direction of the exhaust gas, said deflecting device and said reducing agent feed being arranged to cause the reducing agent to then travel away from the deflecting device in a direction of the exhaust gas.

3. An exhaust system in accordance with claim 2, wherein:

said plurality of deflecting elements are spaced from each other in a direction perpendicular to the direction of the exhaust gas flow;

said reducing agent feed is configured to introduce the reducing agent in a plurality of feed directions;

said plurality of deflecting elements are arranged to form a line of sight blocking arrangement to all the plurality of feed directions of the reducing agent where said material of said exhaust gas-purifying device is arranged.

4. An exhaust system in accordance with claim 3, wherein:

the feed directions of the reducing agent are at an angle spaced from the direction of the exhaust gas flow as the exhaust gas flow passes through said outlet side of said exhaust gas-purifying device;

an axial direction of said exhaust gas-purifying device and an axial direction of said injection area are parallel.

5. An exhaust system in accordance with claim 3, wherein:

said material of said surface of said exhaust gas-purifying device has characteristics that cause undesired deposits or undesired byproducts when in contact with the reducing agent.

6. An exhaust system in accordance with claim 1, wherein:

said deflecting device is arranged to form a line of sight blocking for all reducing agent introduced by said reducing agent feed with a direction and range to contact said material of said exhaust gas-purifying device.

7. An exhaust system for a combustion engine, the exhaust system comprising:

an exhaust gas-purifying means for purifying exhaust gas removed from the combustion engine;

a reducing agent feed means for introducing a reducing agent into the exhaust system, said reducing agent feed means being located at a spaced location downstream from said exhaust gas-purifying means, said reducing agent feed means being arranged with respect to said exhaust gas-purifying means to feed the reducing agent in a direction toward said exhaust gas-purifying means;

a reducing agent-deflecting device arranged between said exhaust gas-purifying means and said reducing agent feed means, said reducing agent-deflecting device having a reducing agent-deflecting element, said deflecting device being arranged to prevent the reducing agent from contacting said exhaust gas-purifying means, said deflecting device being arranged to form a line of sight blocking for a majority of reducing agent introduced by said reducing agent feed means with a feed direction and a feed range to contact said material of said exhaust gas-purifying means.

8. An exhaust system in accordance with claim 7, wherein a direction of flow, in which the reducing agent is introduced into the exhaust system, extends at least partly opposite a direction of flow of the exhaust gas in the exhaust system.

9. An exhaust system in accordance with claim 7, wherein the reducing agent-deflecting element is designed such that reducing agent introduced by the reducing agent feed means into the exhaust system and reaching the reducing agent-deflecting element is deflected in a direction away from the exhaust gas-purifying means.

10. An exhaust system in accordance with claim 7, wherein the reducing agent-deflecting element is designed such that reducing agent introduced by the reducing agent feed means into the exhaust system and reaching the reducing agent-deflecting element is evaporated.

11. An exhaust system in accordance with claim 7, wherein the reducing agent-deflecting device is arranged and/or fastened on an outlet side of the exhaust gas-purifying means.

12. An exhaust system in accordance with claim 11, wherein the reducing agent-deflecting elements are arranged and/or designed with a line of sight being blocked, at or adjacent to the outlet side, in a direction of propagation of the reducing agent.

13. An exhaust system in accordance with claim 12, wherein the reducing agent-deflecting element is formed integrally with a fastening element.

14. An exhaust system in accordance with claim 12, wherein at least five fastening elements are arranged at mutually spaced locations from one another in an area of the outlet cross-sectional area.

15. An exhaust system in accordance with claim 11, further comprising at least one fastening element which has a strut design, wherein:

the outlet side defines an outlet cross-sectional area of the exhaust gas-purifying means;

the at least one fastening element is supported on an end side on the outlet side of the exhaust gas-purifying means;

the at least one fastening element is arranged in the area of an outlet cross-sectional area of the outlet side; and at least one reducing agent-deflecting element is arranged at the at least one fastening element and has a blade design.

16. An exhaust system in accordance with claim 15, wherein:

the at least one fastening element comprises plural fastening elements arranged in the form of a row in the outlet cross-sectional area; and the reducing agent-deflecting elements are arranged each at spaced locations from one another on a respective fastening element whereby a grid of reducing agent-deflecting elements is formed by the reducing agent-deflecting elements.

17. An exhaust system in accordance with claim 15, wherein the at least one fastening element comprises plural fastening elements, each designed as straight struts, which are arranged in parallel and at mutually spaced locations from one another in the area of the outlet cross-sectional area of the exhaust gas-purifying means.

18. An exhaust system in accordance with claim 15, wherein the at least one fastening element comprises plural fastening elements, each designed as a curved strut, which are arranged at mutually spaced locations from one another in the area of the outlet cross-sectional area of the exhaust gas-purifying means.

19. An exhaust system in accordance with claim 7, wherein the reducing agent-deflecting device comprises a plurality of reducing agent-deflecting elements, which are arranged in an area of an outlet side of the exhaust gas-purifying means.

20. An exhaust system in accordance with claim 7, wherein the at least one reducing agent-deflecting element comprises a plurality of reducing agent-deflecting elements, each having a curved or angular design in an axial direction and each being fastened with an axial end section to a respective fastening element.

21. A motor vehicle comprising:
   an internal combustion engine; and
   an exhaust system, the internal combustion engine being arranged upstream of the exhaust system and fluidically connected with the exhaust system, the exhaust system comprising:
      an exhaust gas-purifying means for purifying exhaust gas removed from the internal combustion engine of the motor vehicle;
      a reducing agent feed means for introducing reducing agent into the exhaust system, the reducing agent feed means being located at a spaced location downstream from the exhaust gas-purifying means, said reducing agent feed means being arranged with respect to said exhaust gas-purifying means and being adapted to feed the reducing agent in a direction of propagation toward said exhaust gas-purifying means; and
   a reducing agent-deflecting device arranged between the exhaust gas-purifying means and the reducing agent feed means, the reducing agent-deflecting device having at least one reducing agent-deflecting element with a blade design, the reducing agent-deflecting device comprising a plurality of reducing agent-deflecting elements connected to the gas-purifying means and arranged in an area of an outlet side of the exhaust gas-purifying means, the reducing agent-deflecting elements providing a line of sight blocking of the reducing agent with respect to the direction of propagation of the reducing agent, the reducing agent-deflecting elements being arranged each at spaced locations from one another on a respective fastening element whereby a grid of reducing agent-deflecting elements is formed by the reducing agent-deflecting elements, said deflecting device and said reducing agent feed means being arranged to block the reducing agent from contacting said exhaust gas-purifying means.

\* \* \* \* \*